United States Patent
Woodley

(10) Patent No.: US 11,557,979 B2
(45) Date of Patent: Jan. 17, 2023

(54) VARIABLE FREQUENCY DRIVE WITH INTEGRATED FRONT-END RECTIFIER AND BYPASS

(71) Applicant: Eaton Intelligent Power Limited, Dublin (IE)

(72) Inventor: Kaijam M. Woodley, Brown Deer, WI (US)

(73) Assignee: Eaton Intelligent Power Limited, Dublin (IE)

( * ) Notice: Subject to any disclaimer, the term of this patent is extended or adjusted under 35 U.S.C. 154(b) by 531 days.

(21) Appl. No.: 16/678,277

(22) Filed: Nov. 8, 2019

(65) Prior Publication Data

US 2020/0153348 A1 May 14, 2020

Related U.S. Application Data

(60) Provisional application No. 62/760,988, filed on Nov. 14, 2018.

(51) Int. Cl.
*H02M 5/458* (2006.01)

(52) U.S. Cl.
CPC .................................. *H02M 5/4585* (2013.01)

(58) Field of Classification Search
CPC .. H02M 3/33569; H02M 1/32; H02M 5/4585; H02P 27/06; H02P 27/08
See application file for complete search history.

(56) References Cited

U.S. PATENT DOCUMENTS

| | | | |
|---|---|---|---|
| 4,356,525 A | 10/1982 | Kornrumpf et al. | |
| 5,824,990 A | 10/1998 | Geissler et al. | |
| 5,894,415 A | 4/1999 | Habegger | |
| 6,163,129 A | 12/2000 | Younger et al. | |
| 7,224,557 B2 | 5/2007 | Kinsella et al. | |
| 7,719,219 B2 | 5/2010 | Baumann et al. | |
| 7,940,018 B2 | 5/2011 | Yonemori et al. | |
| 8,014,110 B2 | 9/2011 | Schnetzka et al. | |
| 8,228,019 B2 | 7/2012 | Higuchi et al. | |
| 8,693,170 B2 | 4/2014 | Barreau et al. | |
| 9,018,882 B2 | 4/2015 | Mack et al. | |

(Continued)

OTHER PUBLICATIONS

"PowerGate 'H' HVAC Bypass Controller," Mitsubishi Electric Corporation, Feb. 2, 2017, pp. 1-2, https://us.mitsubishielectric.com/fa/en/solutions/industries/hvac/powergatehseries.

*Primary Examiner* — Kyle J Moody

(74) *Attorney, Agent, or Firm* — DiBerardino McGovern IP Group LLC

(57) ABSTRACT

A motor control system includes a VFD unit comprising a rectifier circuit having a plurality of phase legs each including thereon an upper switching unit and a lower switching unit, an inverter connected to the rectifier circuit by way of a DC link and having a plurality of switches therein controllable to provide a three-phase AC output power to a load, and a bypass relay unit comprising a bypass relay coupled to each of the phase legs of the rectifier circuit downstream from the lower switching unit. An isolation contactor unit is positioned between the inverter and the load and operable to selectively connect/disconnect the inverter to/from the load. The bypass relay unit is operable in a first and second positions to couple the rectifier circuit to the inverter and to couple the rectifier circuit to a bypass path that bypasses the inverter.

20 Claims, 2 Drawing Sheets

(56) References Cited

U.S. PATENT DOCUMENTS

| | | | |
|---|---|---|---|
| 9,641,095 B1 | 5/2017 | Wild et al. | |
| 2004/0262997 A1 | 12/2004 | Gull et al. | |
| 2005/0035664 A1 | 2/2005 | Zver et al. | |
| 2005/0201127 A1* | 9/2005 | Tracy | H02M 7/493 363/37 |
| 2008/0094771 A1 | 4/2008 | Messersmith et al. | |
| 2008/0103632 A1 | 5/2008 | Saban et al. | |
| 2010/0188066 A1* | 7/2010 | Rodenhiser | H02J 9/00 323/302 |
| 2012/0098261 A1 | 4/2012 | Rozman et al. | |
| 2013/0020975 A1 | 1/2013 | Wolfe et al. | |
| 2013/0076126 A1 | 3/2013 | Hashimoto | |
| 2013/0099567 A1 | 4/2013 | Pfitzer | |
| 2013/0235494 A1 | 9/2013 | Holce et al. | |
| 2015/0035286 A1 | 2/2015 | Stephens | |
| 2015/0162864 A1 | 6/2015 | Moghadas et al. | |
| 2015/0171733 A1 | 6/2015 | Zargari et al. | |
| 2015/0283911 A1 | 10/2015 | Ambrosio | |
| 2016/0043670 A1 | 2/2016 | Nakamura et al. | |
| 2016/0268797 A1 | 9/2016 | Li et al. | |
| 2017/0110991 A1 | 4/2017 | Frampton et al. | |
| 2017/0141609 A1* | 5/2017 | King | H02M 5/458 |
| 2018/0034403 A1 | 2/2018 | Kim et al. | |
| 2018/0167002 A1 | 6/2018 | Frampton et al. | |
| 2018/0178830 A1 | 6/2018 | Koseki et al. | |
| 2019/0199086 A1* | 6/2019 | Li | H02P 7/2913 |

\* cited by examiner

VARIABLE FREQUENCY DRIVE WITH INTEGRATED FRONT-END RECTIFIER AND BYPASS

CROSS-REFERENCE TO RELATED APPLICATIONS

The present invention claims priority to U.S. Provisional Patent Application Ser. No. 62/760,988 filed Nov. 14, 2018, the disclosure of which is incorporated herein by reference in its entirety.

BACKGROUND OF THE INVENTION

Embodiments of the invention relate generally to motor control systems and, more particularly, to a variable frequency drive (VFD) that includes an integrated front-end rectifier and bypass circuit.

One type of system commonly used in industry that performs power conversion is an adjustable speed drive, also known as a variable frequency drive (VFD). A VFD is an industrial control device that provides for variable frequency, variable voltage operation of a driven system, such as an AC induction motor. In use, a VFD is often provided as part of a motor control system and overall control and protection assembly that includes the VFD as well as an arrangement of input/output fuses, disconnects, circuit breakers or other protection devices, controllers, filters, sensors, and a bypass assembly that includes one or more of a bypass contactor and soft starter that provide alternate control paths or mechanisms for controlling the driven system.

As a general rule in known motor control systems, the VFD and associated protection and control devices are provided as discrete components having their own housings. The discrete, housed components are positioned within a large metal enclosure and are fixed to a support within the enclosure, such as a DIN rail for example, with wiring being provided between the components to provide for electrical connectivity and/or communication therebetween. When the overall collection of components is assembled as a unit, the enclosure required to house the components becomes quite large and bulky and a large amount of wiring is required between the components, which can increase installation time and the potential for failure due to wiring and wiring connections and reduces the overall efficiency of the motor control system.

It would therefore be desirable to provide a motor control system with a reduced cost, increased efficiency, and improved operational flexibility. It would also be desirable for such a motor control system to integrate and combine separate components where possible, to limit the number of components needed and provide a comprehensive product offering.

BRIEF DESCRIPTION OF THE INVENTION

In accordance with one aspect of the invention, a motor control system for selectively controlling power from a power source to a load is provided. The motor control system includes a VFD unit comprising an input connectable to the power source and a rectifier circuit connected to the input, the rectifier circuit comprising a plurality of phase legs each including thereon an upper switching unit and a lower switching unit. The VFD unit further includes an inverter connected to the rectifier circuit by way of a DC link and having a plurality of switches therein controllable to provide a three-phase AC output power to the load and a bypass relay unit comprising a bypass relay coupled to each of the phase legs of the rectifier circuit downstream from the lower switching unit. The motor control system also includes an isolation contactor unit positioned between the inverter and the load and operable to selectively connect the inverter to the load and isolate the inverter from the load. The bypass relay unit is operable in a first position to couple the rectifier circuit to the inverter and in a second position to couple the rectifier circuit to a bypass path that bypasses the inverter.

In accordance with another aspect of the invention, a VFD unit for selectively controlling power from an AC power source to a load is provided. The VFD unit includes an input connectable to the AC power source and a rectifier circuit connected to the input, the rectifier circuit comprising a plurality of phase legs each including thereon an upper switching unit and a lower switching unit. The VFD unit also includes an inverter connected to the rectifier circuit by way of a DC link and having a plurality of switches therein controllable to provide a three-phase AC output power to the load and a bypass relay coupled to each of the phase legs of the rectifier circuit downstream from the lower switching unit, the bypass relays operable in a first position to couple the rectifier circuit to the inverter and in a second position to decouple the rectifier from the inverter.

In accordance with yet another aspect of the invention, a method of operating a VFD unit that includes a rectifier circuit, an inverter, and a bypass relay unit positioned between the rectifier circuit and the inverter, is provided. The method includes operating the VFD unit to provide power to a load in a VFD mode of operation, wherein operating the VFD unit in the VFD mode comprises operating the bypass relay unit in a first position to couple the rectifier circuit to the inverter and operating a plurality of switches in the inverter to provide a controlled three-phase AC output power to the load. The method also includes operating the VFD unit to provide power to the load in a bypass mode of operation, wherein operating the VFD unit in the bypass mode comprises operating the bypass relay unit in a second position to decouple the rectifier circuit from the inverter and couple the rectifier circuit to a bypass path that bypasses the inverter, operating a plurality of switches in the inverter to provide a controlled three-phase AC output power, and operating a plurality of low-side switching units in the rectifier circuit to provide a ramped three-phase AC output power to the load, so as to provide for a soft start of the load.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a motor control system that includes a variable frequency drive (VFD) unit and an isolation contactor positioned between the VFD unit and a load. The VFD unit includes an integrated front-end rectifier and bypass circuit, with an arrangement of bypass relays that operate in conjunction with low side switches of the front-end rectifier and with the isolation contactor to selectively provide VFD and bypass modes of operation for operating the load.

While embodiments of the invention are described and illustrated herebelow as being directed to a motor control system, it is recognized that embodiments of the invention are not meant to be limited to such circuits. That is, embodiments of the invention may be extended more generally to power/energy conversion circuits of varying constructions and implementations, including motor starters, motor control centers, and power/energy conversion circuits for driving non-motor loads, for example. Accordingly, the following discussion of a motor control system is not meant to limit the scope of the invention.

Figure 1:
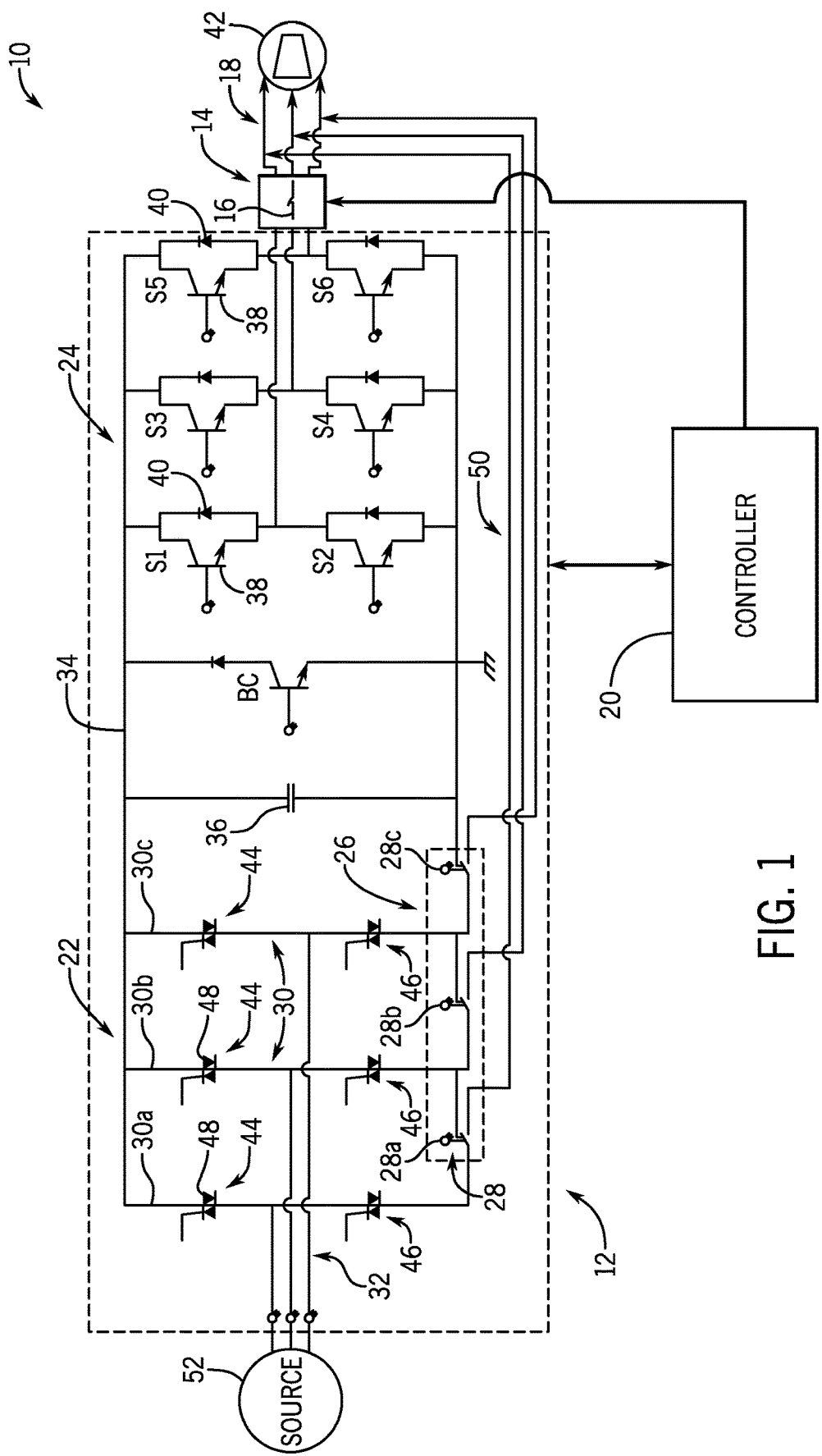
FIG. 1 is a schematic diagram of a motor control system that includes variable frequency drive with an integrated front-end rectifier and bypass, according to an embodiment of the invention.

Referring to FIG. 1, schematic diagram of a motor control system 10 is illustrated according to an embodiment of the invention. The motor control system 10 is composed generally of a VFD unit 12, isolation contactor unit 14 (including a contactor 16 on each phase of a three-phase output 18 of the VFD unit 12), and controller 20 that selectively controls operation of the VFD unit 12 and isolation contactor unit 14. As shown in FIG. 1, the VFD unit 12 is constructed as a VFD unit having a generally standard construction, such that the VFD unit 12 includes a three-phase rectifier circuit 22 and an inverter 24 for performing rectification and inversion of a received AC input, but VFD unit 12 also includes an add-on bypass relay unit 26 (including a bypass relay 28 on each phase leg 30 of rectifier circuit 22) that is incorporated therein. An AC power may be fed to the three-phase rectifier circuit 22 via input 32, with the rectifier circuit 22 converting the AC power input to a DC power, such that a DC voltage is present on DC link 34 between the rectifier circuit 22 and the inverter 24. The link voltage is smoothed by a DC link capacitor bank 36. The inverter 24 may be comprised of a series of insulated gate bipolar transistor (IGBT) switches 38 and anti-parallel diodes 40, such as an arrangement of six IGBT switches 38 and diodes 40, that collectively form inverter 24—with the inverter 24 being controlled via a pulse width modulation (PWM) technique, for example, to synthesize AC voltage waveforms with a fixed frequency and amplitude for delivery to a load 42, which is in the form of a three-phase electrical machine such as an induction motor, for example. While the inverter 24 is described above as including IGBT switches 38, it is recognized that other embodiments of the invention contemplate other power switching devices as known in the art, such as MOSFETs, for example. Operation of the inverter 24 is via controller 20, which may further be comprised of a plurality of PI controllers, with the controller 20 interfacing to the inverter 24 via gate drive signals and sensing of the DC bus voltage and pole currents (by way of voltage sensor(s) for example) such that changes in DC bus voltage can be sensed. These voltage changes can be interpreted as transient load conditions and are used to control switching of the switches 38 of inverter 24, such that near steady-state load conditions are maintained.

As shown in FIG. 1, the rectifier circuit 22 is comprised of six switching units arranged on the three phase legs 30, with an upper/high-side switching unit 44 and a lower/low-side switching unit 46 in series on each of the three phase legs 30 corresponding to the three input phases. Each of the switching units 44, 46 is formed of a pair of unidirectionally conducting solid-state semiconductor switches 48. While the solid-state semiconductor switches 48 are shown as silicon controlled rectifiers (SCRs) or thyristors (referred to hereafter as "SCRs 48") in FIG. 1, it is recognized that other solid-state semiconductor switches 48 could be used instead, including insulated-gate bipolar transistor (IGBTs), metal oxide semiconductor field effect transistors (MOSFETs) or integrated gate-commutated thyristors (IGCTs), for example, although other solid-state semiconductor switches may also be suitable, and thus embodiments of the invention are not meant to be limited to the specific switch types set forth above. Furthermore, the switches 48 can be made with Silicon (Si), Silicon Carbide (SiC), Gallium Nitride (GaN), or any suitable Wide Bandgap (WBG) material, with exemplary embodiments having the switches made of GaN or SiC.

According to embodiments of the invention, rectifier circuit 22 may be operated as an active front end rectifier circuit or a passive front-end rectifier circuit. That is, it is recognized that SCRs 48 of rectifier circuit 22 may be operated so as to provide active rectification or passive rectification in VFD unit 12. In operation as a passive front-end rectifier circuit 22, SCRs 48 may be left gated On during normal operation of the VFD unit 12, such that current flows through SCRs 48 in an uncontrolled manner. In operation as an active front end rectifier circuit 22, SCRs 48 may be selectively gated On and Off during normal operation of the VFD unit 12, such that current flows through SCRs 48 in a controlled manner. The operation of rectification circuit 22 in an active or passive/uncontrolled fashion (based on operation of SCRs 48) can be determined based on the implementation of VFD unit 12 and the needs/requirements thereof, and appropriate associated components would be included in the VFD unit 12 if operated as an active front end rectifier—e.g., an LCL filter (not shown) would be included in the VFD unit 12 for an active rectifier circuit 22, but is not required in an uncontrolled front end rectifier configuration.

In motor control system 10, isolation contactor unit 14 is positioned downstream of VFD unit 12—between VFD unit 12 and load 42—and is selectively operable to connect and isolate the output of inverter 24 to load 42. In an exemplary embodiment, isolation contactor unit 14 is comprised of an arrangement of electromechanical contactors 16, with a contactor 16 provided on each phase of the three-phase output 18, as is known in the art. The isolation contactor unit 14 (i.e., contactors 16 thereof) may be operated in an On/closed state to conduct current therethrough and an Off/open state to block current therethrough.

As further shown in FIG. 1, the bypass relay unit 26 (comprised of the arrangement of bypass relays/contactors 28) is incorporated into VFD unit 12. According to an exemplary embodiment, bypass relays 28 are provided as single pole double throw (SPDT) relays connected to each of the phase legs 30 of rectifier circuit 22 downstream from lower switching unit 46, with a first bypass relay 28a connected to a first phase leg 30a, a second bypass relay 28b connected to second phase leg 30b, and a third bypass relay 28c connected to a third phase leg 30c including.

The bypass relays 28 are operable with the rectifier circuit 22 (i.e., with the lower switching units 46 of the front-end rectifier circuit 22) to selectively allow for operation of the VFD unit 12 in a power conversion mode (i.e., VFD mode) of operation and a bypass mode of operation. That is, the bypass relays 28 are operable in a first position or state that connects the rectifier circuit 22 to inverter 24 when in the VFD mode and a second position or state that disconnects the rectifier circuit 22 from the inverter 24 when in the bypass mode and in a second position or state. In one embodiment, the first position/state may be a nominally closed position/state in which the bypass relays 28 originally operate. In the VFD mode of operation, power is provided to load 42 through the inverter 24 of VFD unit 12, while in the bypass mode of operation power is provided to load 42 through a bypass path 50 (with inverter 24 disconnected). In the case of an inverter fault, over temperature fault, or other error in the VFD unit 12, load operation can be automatically transferred to the bypass path 50 to continue operation of the load 42, maintain drive life, and for other benefits. The controller 20 may also determine to transfer load operation to the bypass path 50 when it is desired to operate the load 42 in a steady-state condition (e.g., full speed) that does not require power conditioning by the inverter 24, such that bypassing thereof might be beneficially employed to reduce switching losses, etc.

According to embodiments of the invention, the controller 20 may make a determination of whether to operate the motor control system 10 in the VFD mode or the bypass mode of operation based on a number of inputs and/or measured parameters. In one embodiment, the controller 20 may make the determination of whether to operate motor control system 10 in VFD mode or bypass mode based upon one or more inputs by an operator indicating that the load 42 is to be operated in a steady-state condition (e.g., at full speed) that does not require power conditioning by the inverter 24 of VFD unit 12, such that bypassing thereof might be beneficially employed (e.g., to reduce switching losses). In another embodiment, the controller 20 may make this determination based upon detection that the VFD unit 12 has experienced a fault condition or is otherwise not functioning properly. That is, controller 20 may compare one or more voltage and/or current values measured in the VFD unit 12, as inputs to the VFD unit 12, or as outputs from the VFD unit 12 (such as measured by voltage and/or current sensors or sensing circuits (not shown), for example), to one or more pre-defined thresholds in order to sense a short circuit, or other fault condition in the motor control system 10. For example, one or more voltage or current sampling or sensing circuits or sensors (not shown) may operate to measure one or more of the following voltage/current parameters in the motor control system 10, including: three phase input currents or voltages to the VFD unit 12, current at the switch level of rectifier circuit 22 or inverter 24 and/or on DC link 34 in the VFD unit 12, and/or load output currents or voltages from the VFD unit 12, for example. As one example, the controller 20 compares the DC link voltage to a pre-defined "Overvoltage Condition" to determine if the VFD unit 12 has malfunctioned.

In controlling operation of motor control system 10 in the VFD mode and bypass mode of operation, controller 20 selectively controls operation of bypass relay unit 26, isolation contactor unit 14, switches 38 of inverter 24, and switching units 44, 46 of rectifier circuit 22, such as via the transmission of control signals or gate drive signals thereto. By controlling the opening/closing of bypass relay unit 26 and isolation contactor unit 14 and the conductivity of switches 38 and switching units 44, 46, current through the VFD unit 12 can be selectively controlled. More specifically, the bypass relay unit 26 and isolation contactor unit 14 may be selectively controlled to provide for current flow through the inverter 24 of VFD unit 12 and out to load 42 when the motor control system 10 is operating in the VFD mode and to not allow current flow through the inverter 24 of VFD unit 12 when the motor control system 10 is operating in the bypass mode (instead electrically isolating the inverter 24 from power source 12 and load 42), instead directing current flow along the bypass path 50 to load 42.

In the event that motor control system 10 needs to operate in the bypass mode, controller 20 operates to cause the switches 38 in inverter 24 to turn to their open/Off state to terminate power flow through inverter 24 and also causes the inverter 24 to be taken off-line by sending control signals to bypass relay unit 26 that cause the bypass relays 28 to operate in a closed bypass position—thereby isolating the inverter 24 from front-end rectifier circuit 22 (and power source 52) and connecting the rectifier circuit 22 to bypass path 50. Next, the controller 20 causes the isolation contactor unit 14 to move to the open/Off position, so as to disconnect the inverter 24 from load 42. In the bypass mode, the controller 20 then commutates the lower switching units 46 in order to ramp up the load 42 and provide the bypass mode, with the lower switching units 46 acting as the line voltage to the load path. In commutating the lower switching units 46 of rectifier circuit 22, the switches 48 can be voltage notch controlled in order to limit the voltage and allow a soft start for the load 42. Using zero-cross and back EMF (BEMF) voltage values from the line and load side voltage, the motor control system 10 can allow for a flying start if the load 42 is operating at line frequency.

In the event that motor control system 10 needs to operate in the VFD mode, controller 20 operates to cause the inverter 24 to be on-line, with the controller 20 sending control signals to bypass relay unit 26 that cause the bypass relays 28 to operate in their nominally closed state—thereby connecting the inverter 24 to front-end rectifier circuit 22 (and power source 52) and isolating the bypass path 50 from rectifier circuit 22. Next, the controller 20 causes the isolation contactor unit 14 (i.e., contactors 16 thereof to operate in the closed/On position, so as to connect the inverter 24 to load 42. The switches 38 of inverter 24 then are controlled by controller 20 via a known PWM technique in order to synthesize AC voltage waveforms with a fixed frequency and amplitude for delivery to the load 42.

Figure 2:
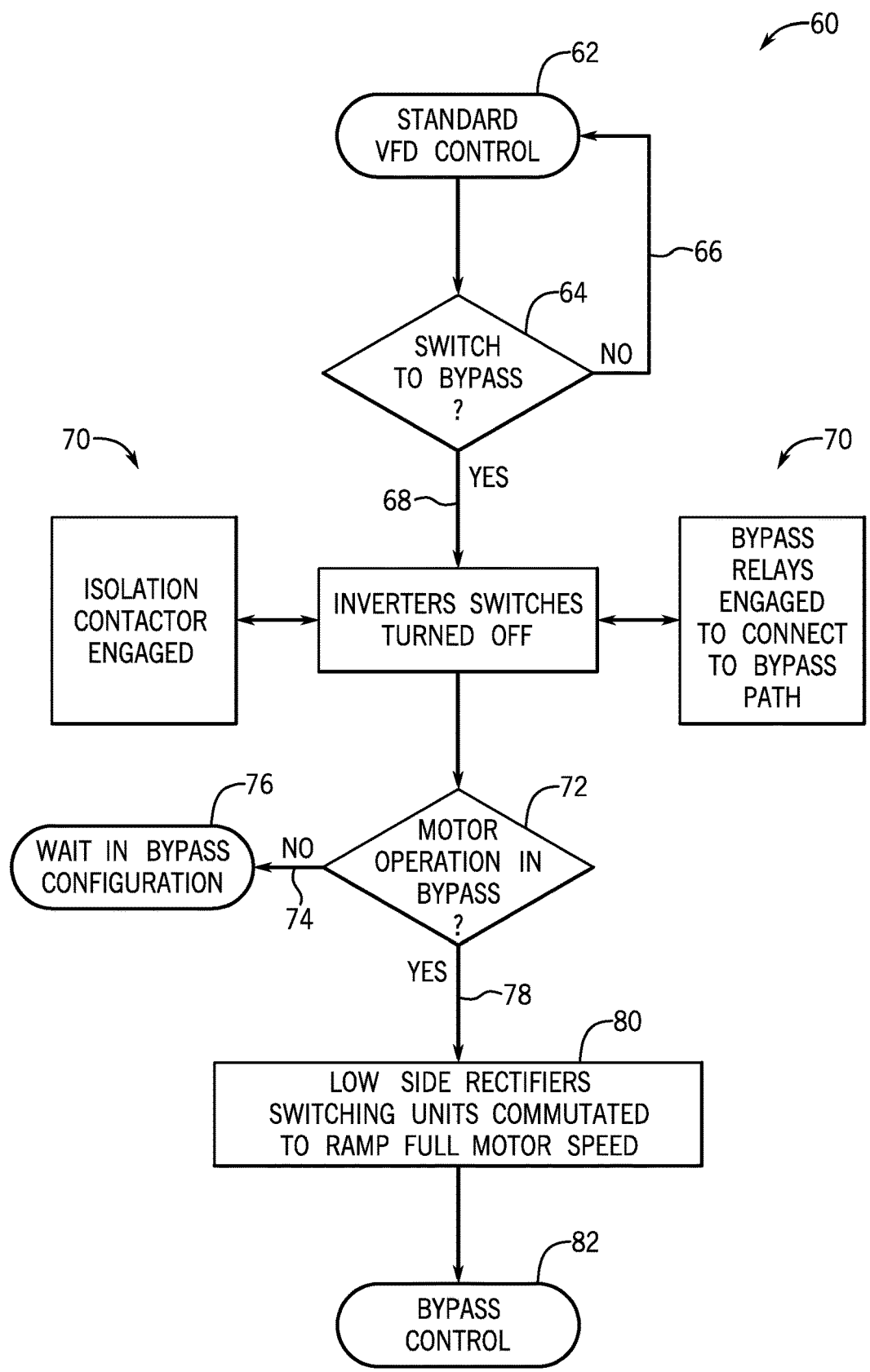
FIG. 2 is a flowchart illustrating a technique for operating the motor control system of FIG. 1 in power conversion and bypass modes of operation, according to an embodiment of the invention.

Referring now to FIG. 2, and with continued reference to FIG. 1, a technique 60 for operating the motor control system 10 in VFD and bypass modes of operation is illustrated that would be implemented by controller 20, for example, according to an embodiment of the invention. The technique 60 begins at STEP 62, with the motor control system 10 operating in the VFD mode. In the VFD mode, the contactors 16 in isolation contactor unit 14 are in the On/closed position such that the VFD unit 12 is connected to load 42. Additionally, bypass relays 28 are each in their nominally On/closed position, such that rectifier circuit 22 is electrically coupled to inverter 24—with the DC link 34 thus providing power to inverter 24, which in turn provides a controlled three-phase power output to load 42.

At STEP 64, a determination is made of whether the motor control system 10 should switch to the bypass mode of operation. The determination of whether to switch to bypass mode may be made based on a number of inputs and/or measured parameters. In one embodiment, the controller 20 may make the determination of whether to operate motor control system 10 in VFD mode or bypass mode based upon one or more inputs by an operator indicating that the load 42 is to be operated in a steady-state condition (e.g., at full speed) that does not require power conditioning by the inverter 24 of VFD unit 12, such that bypassing thereof might be beneficially employed (e.g., to reduce switching losses). In another embodiment, the controller 20 may make this determination based upon detection that the VFD unit 12 has experienced a fault condition or is otherwise not functioning properly, such as by comparing one or more voltage and/or current values to one or more pre-defined thresholds in order to sense a short circuit or other fault condition in the motor control system 10.

If it is determined at STEP 64 that motor control system 10 should remain in VFD mode (and not switch to bypass mode), as indicated at 66, then technique 60 returns to STEP 62 and the motor control system 10 continues to operate in VFD mode. Alternatively, if it is determined at STEP 64 that that motor control system 10 should switch to bypass mode, as indicated at 68, then technique 60 continues to STEP 70, where VFD unit 12 and isolation contactor unit 14 are controlled such that the load 42 is decoupled from inverter 24. That is, at STEP 70, the switches 38 in inverter 24 are all turned to their open/Off state to terminate power flow through inverter 24, while isolation contactor unit 14 (i.e., contactors 16 thereof) is moved to the open/Off state and bypass relays 28 are engaged to their second (or "bypass") position/state. Upon completion of STEP 70, load 42 is decoupled from inverter 24 and power is routed from rectifier circuit 22, along bypass path 50, and to load 42.

Technique 60 then continues to STEP 72, where a determination is made as to whether the load 42 is to be operated in bypass mode—i.e., whether the load 42 is to receive power while motor control system 10 is operating in the bypass mode, such as when the load 42 is to be operated in a steady-state condition (e.g., at full speed) that does not require power conditioning by the inverter 24 of VFD unit 12, for example. If the load 42 is to not receive power while motor control system 10 is operating in the bypass mode, as indicated at 74, then technique 60 continues to STEP 74, where the motor control system 10 waits in the bypass configuration and no power is provided to the load 42. Alternatively, if the load 42 is to receive power while motor control system 10 is operating in the bypass mode, as indicated at 78, then technique 60 continues to STEP 80, where the switching units 44, 46 of rectifier circuit 22 are selectively controlled to provide power to the load 42. Specifically, accordingly to an exemplary embodiment, the lower switching units 46 (i.e., switches 48 thereof) are commutated in order to ramp up the load 42 to full speed, with the lower switching units 46 acting as the line voltage to load path. In commutating the lower switching units 46 of rectifier circuit 22, the switches 48 can be voltage notch controlled in order to limit the voltage and allow a soft start for the load 42. Thus, as indicated at STEP 82, load 42 receives power during the bypass mode of operation.

Beneficially, integration of bypass functionality into the front-end rectifier circuit on the VFD unit allows for simplification of the motor control system. That is, the integration of the bypass functionality into the front-end rectifier circuit on the VFD unit eliminates the need for a stand-alone bypass circuit/component, as such functionality or firmware is provided in VFD unit. Additionally, integration of the bypass functionality into the front-end rectifier circuit on the VFD unit allows for a single controller or central processor to control operation of motor control system based on inputs or sensed parameters provided to controller, as described above. The VFD unit with the integrated front-end rectifier circuit and bypass circuit provides a reduced package size and cost for the motor control system, eliminates wiring between discrete components so as to reduce cable losses, requires fewer terminal connections, and eliminates voltage losses of those connections, such that a more efficient motor control system is provided.

According to one embodiment of the present invention, a motor control system for selectively controlling power from a power source to a load is provided. The motor control system includes a VFD unit comprising an input connectable to the power source and a rectifier circuit connected to the input, the rectifier circuit comprising a plurality of phase legs each including thereon an upper switching unit and a lower switching unit. The VFD unit further includes an inverter connected to the rectifier circuit by way of a DC link and having a plurality of switches therein controllable to provide a three-phase AC output power to the load and a bypass relay unit comprising a bypass relay coupled to each of the phase legs of the rectifier circuit downstream from the lower switching unit. The motor control system also includes an isolation contactor unit positioned between the inverter and the load and operable to selectively connect the inverter to the load and isolate the inverter from the load. The bypass relay unit is operable in a first position to couple the rectifier circuit to the inverter and in a second position to couple the rectifier circuit to a bypass path that bypasses the inverter.

According to another embodiment of the present invention, a VFD unit for selectively controlling power from an AC power source to a load is provided. The VFD unit includes an input connectable to the AC power source and a rectifier circuit connected to the input, the rectifier circuit comprising a plurality of phase legs each including thereon an upper switching unit and a lower switching unit. The VFD unit also includes an inverter connected to the rectifier circuit by way of a DC link and having a plurality of switches therein controllable to provide a three-phase AC output power to the load and a bypass relay coupled to each of the phase legs of the rectifier circuit downstream from the lower switching unit, the bypass relays operable in a first position to couple the rectifier circuit to the inverter and in a second position to decouple the rectifier from the inverter.

According to yet another embodiment of the present invention, a method of operating a VFD unit that includes a rectifier circuit, an inverter, and a bypass relay unit positioned between the rectifier circuit and the inverter, is provided. The method includes operating the VFD unit to provide power to a load in a VFD mode of operation, wherein operating the VFD unit in the VFD mode comprises operating the bypass relay unit in a first position to couple the rectifier circuit to the inverter and operating a plurality of switches in the inverter to provide a controlled three-phase AC output power to the load. The method also includes operating the VFD unit to provide power to the load in a bypass mode of operation, wherein operating the VFD unit in the bypass mode comprises operating the bypass relay unit in a second position to decouple the rectifier circuit from the inverter and couple the rectifier circuit to a bypass path that bypasses the inverter, operating a plurality of switches in the inverter to provide a controlled three-phase AC output power, and operating a plurality of low-side switching units in the rectifier circuit to provide a ramped three-phase AC output power to the load, so as to provide for a soft start of the load.

The present invention has been described in terms of the preferred embodiment, and it is recognized that equivalents, alternatives, and modifications, aside from those expressly stated, are possible and within the scope of the appending claims.

What is claimed is:

1. A motor control system for selectively controlling power from a power source to a load, the motor control system comprising:
a variable frequency drive (VFD) unit comprising:
an input connectable to the power source;

a rectifier circuit connected to the input, the rectifier circuit comprising a plurality of phase legs each including thereon an upper switching unit and a lower switching unit;

an inverter connected to the rectifier circuit by way of a DC link and having a plurality of switches therein controllable to provide a three-phase AC output power to the load; and a bypass relay unit comprising a plurality of bypass relays, at least one of the plurality of bypass relays coupled to each of the phase legs of the rectifier circuit downstream from the lower switching unit; and an isolation contactor unit positioned between the inverter and the load and operable to selectively connect the inverter to the load and isolate the inverter from the load;

wherein the bypass relay unit is operable in a first position to couple the rectifier circuit to the inverter and in a second position to couple the rectifier circuit to a bypass path that bypasses the inverter.

2. The motor control system of claim 1 further comprising a controller operatively coupled to the bypass relay unit and the isolation contactor unit, the controller programmed to control switching of the plurality of switching devices between On and Off states to selectively route power to the power converter and bypass the power converter.

3. The motor control system of claim 2 wherein the controller is programmed to:

receive an input comprising one of more of an operational status of the VFD unit and a desired operating condition of the load;

determine a desired operating condition of the motor control system based on the received input, the desired operating condition comprising one of a VFD mode and a bypass mode; and control operation of the bypass relay unit and the isolation contactor unit, so as to cause the motor control system to operate in one of the VFD mode and the bypass mode.

4. The motor control system of claim 3 wherein, in causing the motor control system to operate in the VFD mode, the controller is programmed to:

operate the bypass relay unit in the first position to couple the rectifier circuit to the inverter; and operate the isolation contactor unit in a closed state to connect the inverter to the load.

5. The motor control system of claim 4 wherein the controller is operatively coupled to the inverter, with the controller programmed to control the plurality of switches in the inverter via a pulse width modulation (PWM) technique to provide the three-phase AC output power to the load during the VFD mode of operation.

6. The motor control system of claim 3 wherein, in causing the motor control system to operate in the bypass mode, the controller is programmed to:

operate the bypass relay unit in the second position to couple the rectifier circuit to the bypass path; and operate the isolation contactor unit in an open state to isolate the inverter from the load.

7. The motor control system of claim 6 wherein the controller is operatively coupled to the rectifier circuit and the inverter, with the controller programmed to:

control the plurality of switches in the inverter in an off state to block a current flow through the inverter; and control the lower switching unit on each of the phase legs in order to limit voltage to the load and provide for a soft start for the load.

8. The motor control system of claim 7 wherein, in controlling the lower switching unit on each of the phase legs, the controller is programmed to commutate the lower switching units via a voltage notch control technique.

9. The motor control system of claim 1 wherein each bypass relay comprises a single pole double throw (SPDT) relay.

10. The motor control system of claim 1 wherein each of the upper switching units and the lower switching units comprises a pair of unidirectionally conducting solid-state semiconductor switches.

11. A variable frequency drive (VFD) unit for selectively controlling power from an AC power source to a load, the VFD unit comprising:

an input connectable to the AC power source;

a rectifier circuit connected to the input, the rectifier circuit comprising a plurality of phase legs each including thereon an upper switching unit and a lower switching unit;

an inverter connected to the rectifier circuit by way of a DC link and having a plurality of switches therein controllable to provide a three-phase AC output power to the load; and a plurality of bypass relays, at least one of the plurality of bypass relays coupled to each of the phase legs of the rectifier circuit downstream from the lower switching unit.

12. The VFD unit of claim 11 wherein each bypass relay comprises a single pole double throw (SPDT) relay movable between the first and second positions.

13. The VFD unit of claim 11 wherein each of the upper switching units and the lower switching units comprises a pair of unidirectionally conducting solid-state semiconductor switches.

14. The VFD unit of claim 11 further comprising a controller operatively coupled to the bypass relays and the rectifier circuit, wherein the controller is programmed to control the lower switching unit on each of the phase legs in order to provide a ramped AC power to the load, so as to provide for a soft start of the load.

15. The VFD unit of claim 14 wherein, in controlling the lower switching unit on each of the phase legs, the controller is programmed to commutate the lower switching units via a voltage notch control technique.

16. The VFD unit of claim 14 wherein the controller is programmed to operate the bypass relays in a first position when operating the VFD unit in a VFD mode of operation and to operate the bypass relays in a second position when operating the VFD unit in a bypass mode of operation.

17. A method of operating a variable frequency drive (VFD) unit that includes a rectifier circuit, an inverter, and a bypass relay unit positioned between the rectifier circuit and the inverter, the method comprising:

operating the VFD unit to provide power to a load in a VFD mode of operation, wherein operating the VFD unit in the VFD mode comprises:

operating the bypass relay unit in a first position to couple the rectifier circuit to the inverter; and operating a plurality of switches in the inverter to provide a controlled three-phase AC output power to the load; and operating the VFD unit to provide power to the load in a bypass mode of operation, wherein operating the VFD unit in the bypass mode comprises:

operating the bypass relay unit in a second position to decouple the rectifier circuit from the inverter, with the bypass relay unit coupling the rectifier circuit to a bypass path that bypasses the inverter when in the second position; and operating a plurality of switches in the inverter to provide a controlled three-phase AC output power; and operating a plurality of low-side switching units in the rectifier circuit to provide a ramped three-phase AC output power to the load, so as to provide for a soft start of the load.

18. The method of claim 17 wherein, in operating the VFD unit in the bypass mode, the method further comprises controlling the plurality of switches in the inverter in an off state to block a current flow through the inverter.

19. The method of claim 17 wherein operating the plurality of low-side switching units further comprises commutating the low-side switching units via a voltage notch control technique.

20. The method of claim 17 further comprising:
receiving an input comprising one of more of an operational status of the VFD unit and a desired operating condition of the load; and
determining whether to operate the VFD unit in the VFD mode or the bypass mode based on the received input.

* * * * *